United States Patent [19]

Kuma et al.

[11] Patent Number: 5,753,345
[45] Date of Patent: May 19, 1998

[54] ADSORBER FOR HUMIDITY AND ODOROUS GAS EXCHANGE

[75] Inventors: Toshimi Kuma, Fukuoka; Noriaki Shirahama, Onojo; Hiroaki Izumi, Koga-machi, all of Japan

[73] Assignee: Kabushiki Kaisha Seibu Giken, Fukuoka, Japan

[21] Appl. No.: 637,377

[22] Filed: Apr. 25, 1996

[30] Foreign Application Priority Data

May 11, 1995 [JP] Japan ................. 7-149362

[51] Int. Cl.$^6$ ................. B32B 3/28; B05D 3/02
[52] U.S. Cl. ................. 428/143; 428/149; 428/167; 428/168; 428/172; 428/331; 428/363; 428/182; 427/372.2; 427/376.2; 427/344; 427/397.7
[58] Field of Search ................. 428/182, 184, 428/116, 143, 149, 167, 168, 172, 363, 331, 4.2, 446; 150/208, 205; 427/372.2, 376.2, 344, 397.7

[56] References Cited

U.S. PATENT DOCUMENTS 4,871,607 10/1989 Kuma et al. ................. 428/186
4,911,775 3/1990 Kuma et al. ................. 156/208

*Primary Examiner*—Donald Loney

[57] ABSTRACT

In an adsorbing body for humidity and odorous gas exchange such as an adsorbing sheet for dehumidification, an adsorbing element for dehumidification or an adsorbing element for total heat energy exchange, a sheet or a honeycomb laminate is impregnated or coated with silica sol containing, as solid content, not more than 30% of the silica sol weight of minute silica particles not larger than 120 Å in diameter which contain many stable silanol radicals on the surface and 0.01–1% of alkali metal ion $Na_2O$. It is then dried to rigidly fix silica gel. Other humidity adsorbing or absorbing agents such as zeolite, organic high-polymer electrolyte, etc. may be mixed in said silica sol. Silica gel with excellent humidity adsorbing ability can be strongly adhered to a sheet or a honeycomb laminate in an extremely simple method.

7 Claims, 12 Drawing Sheets

▲ ● ■ — Sensible heat
△ ○ □ — Total heat
▲ ◐ ◧ — Latent heat

ADSORBER FOR HUMIDITY AND ODOROUS GAS EXCHANGE

BACKGROUND OF THE INVENTION a. Field of the Invention

The present invention relates to an adsorber for humidity and odorous gas exchange such as an adsorbing sheet for dehumidification and to a honeycomb adsorbing element for humidity and odorous gas exchange such as an adsorbing element for dehumidification or an adsorbing element for humidity and sensible heat exchange (called a humidity exchanging body hereinafter).

b. Description of the Prior Art

A honeycomb element using inorganic humidity adsorbing agents such as molecular sieves like zeolite, silica gel and lithium chloride for dehumidification or total heat (humidity and sensible heat) energy exchange, has been used. And the present applicants manufacture and sell humidity and odorous gas exchangers in which silica gel or metal silicate gel is synthesized by chemical reaction of acid or aqueous solution of metallic salt after impregnating a laminate with water glass which is then rigidly adhered (Japanese Pat. No. 1,542,374 and the U.S. Pat. No. 4,911, 775). These adsorbers for dehumidification are used for removing humidity from gases such as air and nitrogen gas in various fields such as semiconductor industry, film industry, food industry and army. A honeycomb element for total heat energy exchange is used as a total heat energy exchanger for buildings, factories and houses for exchanging humidity and sensible heat simultaneously.

SUMMARY OF THE INVENTION

The prior adsorbents such as molecular sieves like zeolite and silica gel mentioned above are dispersed in binders such as silica sol and alumina sol. A honeycomb element is soaked in this dispersion to impregnate minute particles of the inorganic humidity adsorbing agents mentioned above in the sheet that forms the honeycomb element and to fix them rigidly in the sheet. Or in another prior method, minute particles of inorganic humidity adsorbing agents are fixed rigidly by using binders to the sheet that forms the honeycomb element, which sheet is then laminated and shaped in honeycomb structure. In such methods, binders decrease adsorbing area of adsorbents, lowering their adsorbing ability rather than contribute to humidity adsorption. The present invention is to obtain a high efficiency humidity adsorbing sheet and a honeycomb element for humidity and odorous gas exchange by a method as simple as to impregnate one kind of particular silica sol, thus solidify by gelatinize, without using minute particles of such inorganic humidity adsorbing agents nor binders for binding these agents.

The present invention is to obtain a humidity exchanging body by using silica sol which contains silica particles of diameter not larger than approximately 120 Å, having numerous stable silanol radicals on the surface, or by adding various other adsorbents are added to the silica sol, impregnating or coating the mixture to a sheet or to a laminate with numerous small channels (called a honeycomb laminate hereinafter), and by drying it to gelatinize and to fix rigidly minute particles of silica in fiber gaps of and on the surface of the sheet in the laminate.

The silica sol used here contains as solid content not more than 30% of minute particles of silica of diameter not larger than approximately 120 Å having numerous silanol radicals on the surface. When this sol is gelatinized by drying by means of heating or others, minute particles of silica are bound in porous structure, binding to one another, to form micropores. These micropores, with numerous silanol radicals on the surface of minute particles of silica, exhibit strong moisture adsorbing ability. When the diameter of particles in silica sol is big, the diameter of micropores formed by linking of the particle becomes too big, so their moisture adsorbing effect is decreased and linking force of the particles is weakened. Therefore it is unsuitable to be used as a honeycomb humidity adsorbing body. On the other hand very small amount of alkali metal ion contained in silica sol also contributes to moisture adsorbing ability. Therefore used is sol into which a comparatively large amount of this, too, is mixed. Examples are explained below in detail.

DESCRIPTION OF THE PREFERRED EMBODIMENTS

TABLE 1

| Example No. 1 | | | |
|---|---|---|---|
| Silica Sol Sample | Silica Particle Diameter (Å) | Silica Solid Content in Sol (%) | $Na_2O$ Content in Silica Sol (%) |
| No. 1 | 40 | 8 | — |
| 2 | 70 | 20 | 0.3 |
| 3 | 150 | 20 | 0.1 |
| 4 | 250 | 48 | 0.2 |
| 5 | 450 | 20 | 0.2 |

Ceramic fiber paper of 0.2 mm thickness, preferably after it is baked to lower its density, is impregnated with 5 kinds of silica sol of Table 1 above, respectively, so that adhered quantity of silica solid is approximately 64 wt % of the weight of the ceramic paper, and then is dried for 20 minutes at 150° C. to solidify the silica sol. Thus obtained is an adsorbing sheet for humidity and odorous gas exchange.

Figure 3:
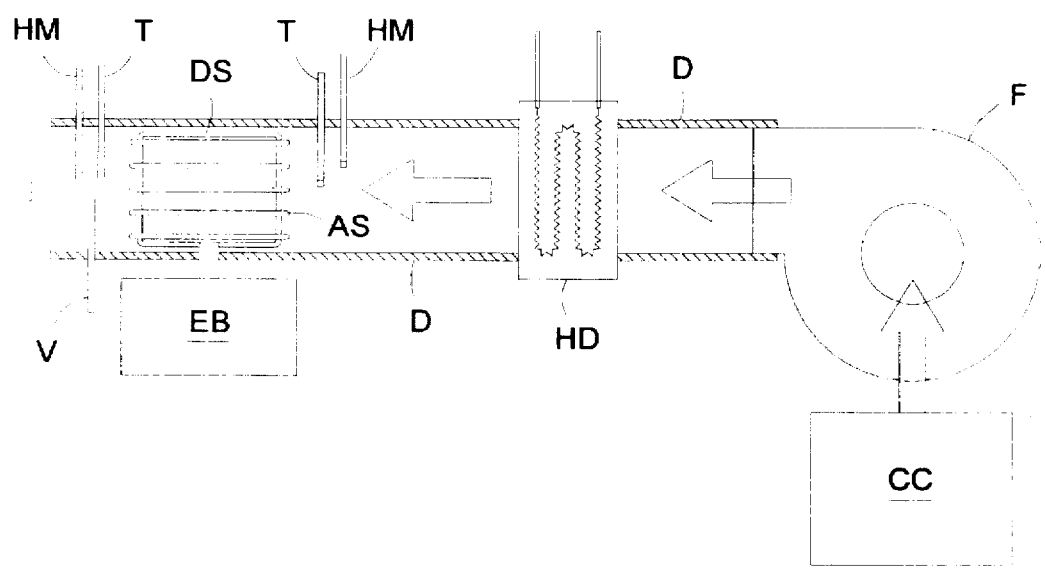
FIG. 3 is an explanatory illustration of a device for measuring the amount of humidity adsorbed by an adsorbing sheet for humidity and odorous gas exchange against time lapse.
Figure 4:
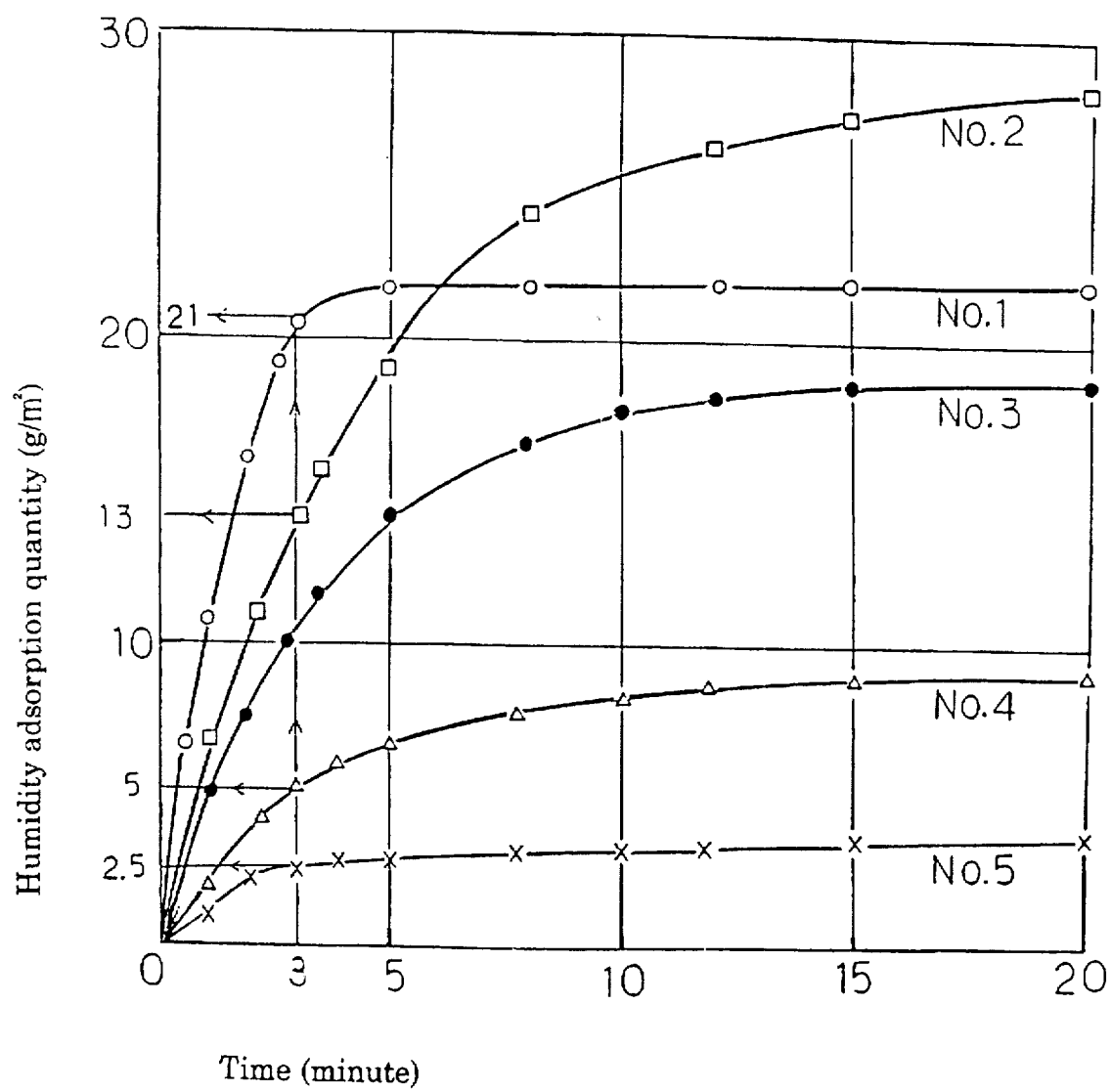
FIG. 4 is a graph showing the humidity adsorption quantity by the adsorbing sheet for humidity and odorous gas exchange of the present invention against time lapse.

FIG. 4 shows the result of measuring humidity adsorbing quantity of this sheet against time lapse. The measuring method starts with heating this sheet at 140° C. for 30 minutes to completely remove its humidity and then adsorption is started. FIG. 3 shows a measuring device, in which several adsorbing sheets AS are mounted with intervals in-between on a stand DS. A fan F is operated to inhale air of constant temperature and humidity from the constant temperature/humidity room CR and to send it into a duct D. A movable heater box HD intervenes in the duct D to raise temperature of air in the duct D to a certain level, the air is then emitted through the adsorbing sheets AS. A thermometer T, a hygrometer HM and an anemometer V are installed before and behind the adsorbing sheets AS to measure each air condition. On the other hand the stand DS on which the adsorbing sheets AS are mounted is mounted directly on an electronic balance EB to measure weight increase as the adsorbing sheets AS adsorb humidity. First the fan F is operated to make constant air velocity in the duct D. Then air is heated to 140° C. by applying electric current to the heater box HD and sent between the adsorbing sheets AS in parallel to them for 30 minutes in order to completely remove humidity from them. Then a heater H is turned off to lower air temperature in the duct D and the rising state of weight increase of the adsorbing sheets AS is measured approximately every 60 seconds starting at the point when the adsorbing sheets start adsorption. This is continued for 20 minutes.

FIG. 4 shows the plot of these values. As seen from FIG. 4, the smaller the silica particle diameter is, the faster the adsorbing speed is. Among them, adsorbing speeds of No. 1 (40 Å) and No. 2 (70 Å) silica particles are the fastest and they can be used for a dehumidifying element or an element for total heat energy exchange. Adsorbing conditions are: Air temperature is 20° C., relative humidity is 70% and air speed at the front of the adsorbing sheets AS is 1 m/sec. In FIG. 4, the abscissa shows adsorbing time (minute) and the ordinate shows humidity quantity (g/m²) adsorbed to the sheets. In the drawing, No. 1, No. 2, No. 3, No. 4 and No. 5 are the adsorbed quantity curves of the humidity on the adsorbing sheets AS against time lapse. In using a rotary dehumidifier, on the other hand, as shown by arrows in FIG. 12, adsorption and desorption are repeated at every rotation of the rotor (approximately 6 minutes). Adsorbing time is approximately 4.5 minutes and desorbing time is approximately 1.5 minutes. Therefore, dehumidifying efficiency depends on how much humidity is adsorbed within this adsorbing time of 4.5 minutes. As shown in FIG. 4, the rising of the adsorbing speed becomes the fastest when silica particle diameter is 40 Å–70 Å. For example, No. 2 adsorbs humidity of approximately 13 g/m² in 3 minutes and No. 1 adsorbs 21 g/m² in 3 minutes. The bigger the particle diameter is, for example like 250 Å and 450 Å, the slower the adsorbing speed is. For example, No. 4 adsorbs humidity of 5 g/m² in 3 minutes and No. 5 adsorbs humidity of 2.5 g/m² in the same 3 minutes. Therefore these with such lower adsorbing ability are unsuitable for using as a dehumidifier nor a total heat energy exchanger. Therefore particles of diameter not larger than approximately 120 Å are the best in ability for dehumidification and total heat energy exchange. On the other hand, an adsorbing element for a total heat energy exchanging body has to efficiently exchange sensible heat and latent heat at the same time at every rotation. The rotation speed of a total heat energy exchange element normally is as fast as 8–16 r.p.m. due to introduction of the maximum value of sensible heat exchanging efficiency, which demands extremely fast humidity adsorbing/ desorbing speed. Therefore, desirable is No. 2 with particle diameter not larger than 70 Å preferably. As seen from FIG. 4, shown is the characteristic that the smaller the diameter of minute silica particles in silica sol is, the faster the adsorbing speed of the sheet is.

EXAMPLE NO. 2

Figure 1:
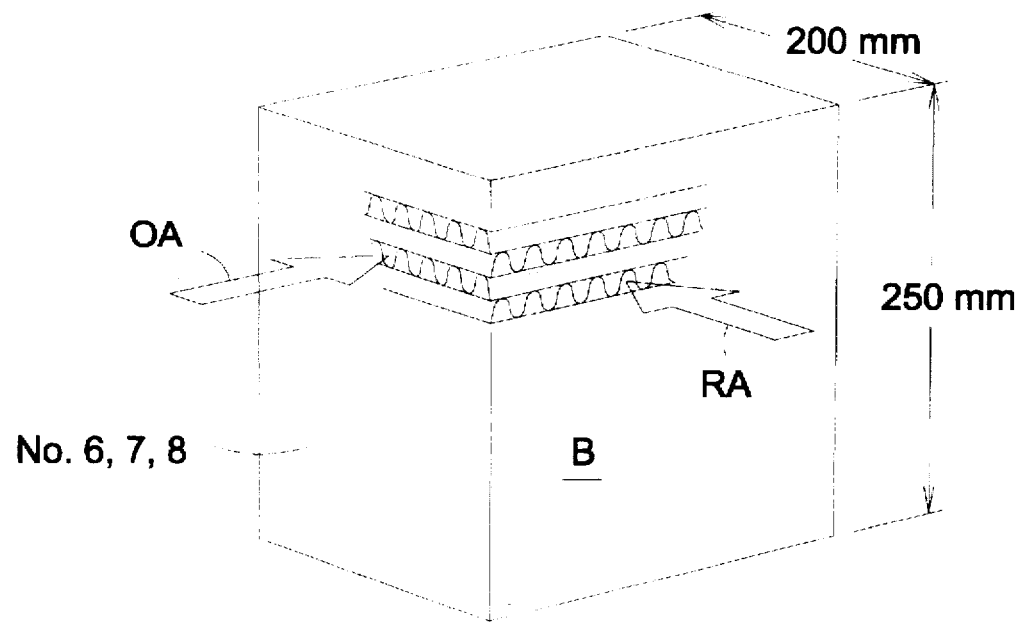
FIG. 1 is a perspective view of a honeycomb block.
Figure 2:
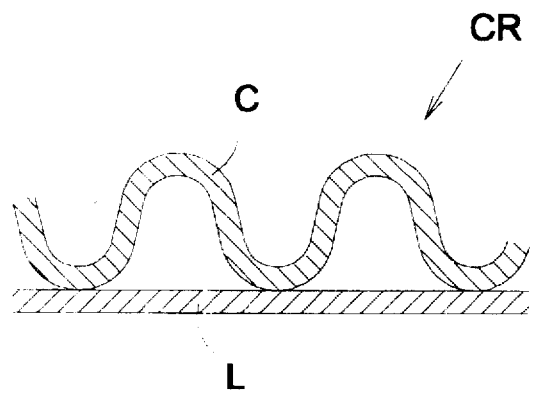
FIG. 2 is a sectional view of a single-faced corrugated sheet.

As shown in FIG. 2, nonflammable paper of 0.2 mm thickness is formed into a single-faced corrugated sheet CR of 4.2 mm pitch and of 2.5 mm height, which is then laminated and formed into a honeycomb block B of 200 mm×200 mm×250 mm as shown in FIG. 1. No. 2 silica sol sample mentioned above is impregnated in this block B and is dried at 150° C. for 20 minutes so that silica solid of approximately 25% of the weight of the block is rigidly fixed to obtain a cross-flow total heat energy exchange element No. 6. Or only a liner L is impregnated with No. 2 silica sol beforehand which is rigidly fixed to the liner. This sheet L and a nonflammable paper C are combined to form a single-faced corrugated sheet CR, which is laminated to obtain a cross-flow total heat energy exchange element No. 6A.

Figure 5:
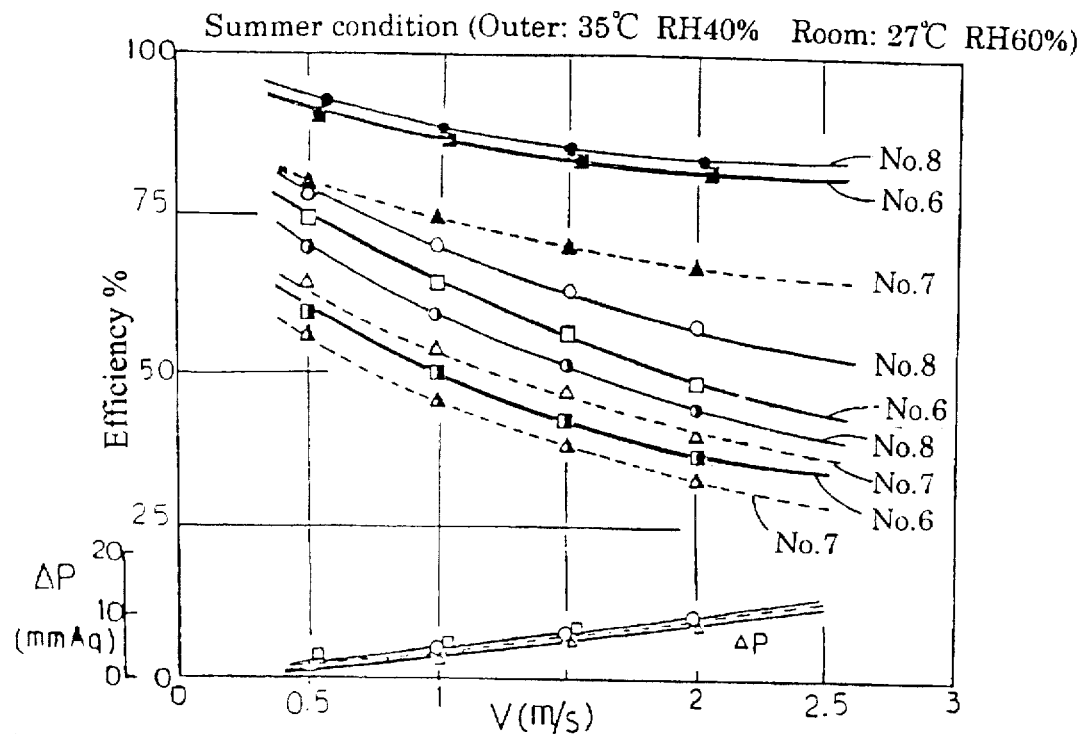
FIG. 5 is a graph showing heat exchange efficiency of a cross-flow type total heat energy exchange element.
Figure 6:
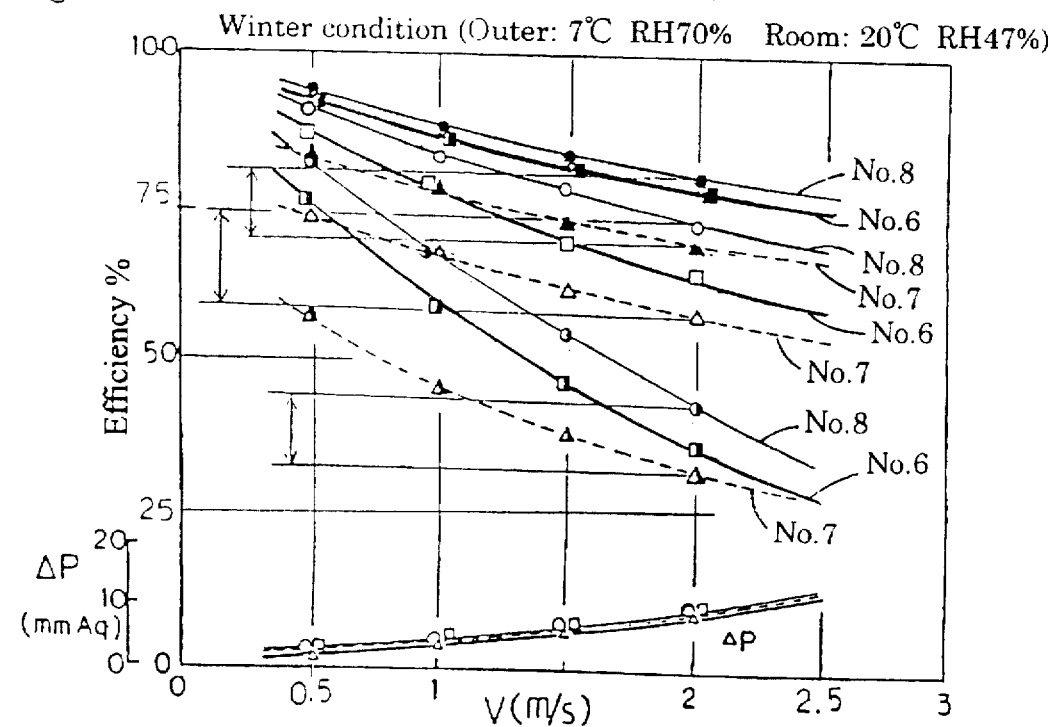
FIG. 6 is a graph showing heat exchange efficiency of a cross-flow type total heat energy exchange element.

FIGS. 5 and 6 show total heat energy, sensible heat and latent heat exchange efficiencies of the cross-flow total heat energy exchange element No. 6 mentioned above, a cross-flow total heat energy exchange element No. 7 to which prior lithium chloride of approximately 4% is impregnated, and an element No. 8 which is prepared by impregnating lithium chloride of approximately 4% in the total heat energy exchange element No. 6 mentioned above. FIG. 5 shows total heat energy exchange efficiencies in summer conditions, i.e., outer air temperature is 35° C., its relative humidity is 40%, return air temperature is 27° C., its relative humidity is 60% and air velocities of both airs are 0.5–2 m/sec. FIG. 6 shows total heat energy exchange efficiencies in winter conditions, i.e., outer air temperature is 7° C., its relative humidity is 70%, return air temperature is 20° C., its relative humidity is 47% and air velocities of both airs are 0.5–2 m/sec. As seen from FIG. 5, when air velocity V (air velocity m/sec. right before flowing into the element in FIG. 1) is 2 m/sec., sensible heat exchange efficiency is by 12% higher than that of the prior total heat energy exchange element No. 7 which is impregnated with lithium chloride, and latent heat exchange efficiency is by approximately 11% higher than that of the prior total heat energy exchange element which is impregnated with lithium chloride. Total heat energy exchange efficiency of the element No. 8 of the present invention, too, is by approximately 13% higher than prior ones.

TABLE 2

| Winter Conditions | Air Velocity (m/sec.) | No.6 No.2 sol impregnated | No.7 LiCl impregnated | No.8 No2. sol and LiCl impregnated |
| --- | --- | --- | --- | --- |
| Sensible Heat Exchange Efficiency | 2 | 77 | 78 | 66 |
|  | 1 | 86 | 88 | 81 |
|  | 0.5 | 91 | 91 | 88 |
| Latent Heat Exchange Efficiency | 2 | 37 | 39 | 32 |
|  | 1 | 58 | 62 | 45 |
|  | 0.5 | 72 | 81 | 56 |
| Total Heat Energy Exchange Efficiency | 2 | 75 | 68 | 58 |
|  | 1 | 77 | 80 | 68 |
|  | 0.5 | 85 | 89 | 70 |

In summer conditions, too, total heat energy exchange efficiency is by approximately 17% higher.

EXAMPLE NO. 3

Figure 7:
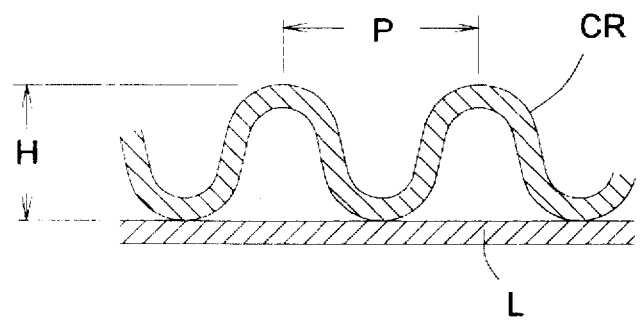
FIG. 7 is a sectional view of a single-faced corrugated sheet.
Figure 8:
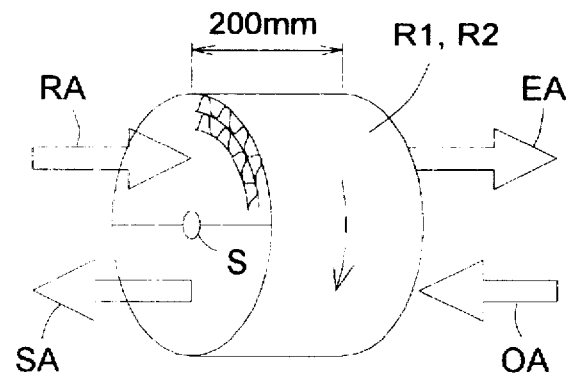
FIG. 8 is a perspective view of a total heat energy exchange rotor.

A paper of 0.2 mm thick mainly consisting of glass fiber (also containing binders, synthetic fiber, etc.) is formed into a single-faced corrugated sheet of 4.2 mm pitch P and 2.2 mm height H as shown in FIG. 7. It is rolled and laminated, being adhered at the same time, around the core material S as shown in FIG. 8 to obtain a cylindrical honeycomb rotor R. This honeycomb rotor R is impregnated with No. 2 silica sol sample of Table 1 mentioned above and is dried at 100° C. for 30 minutes so that silica solid of 20% of the weight of the honeycomb rotor R is rigidly fixed to obtain a total heat energy exchange rotor $R_1$.

Figure 9:
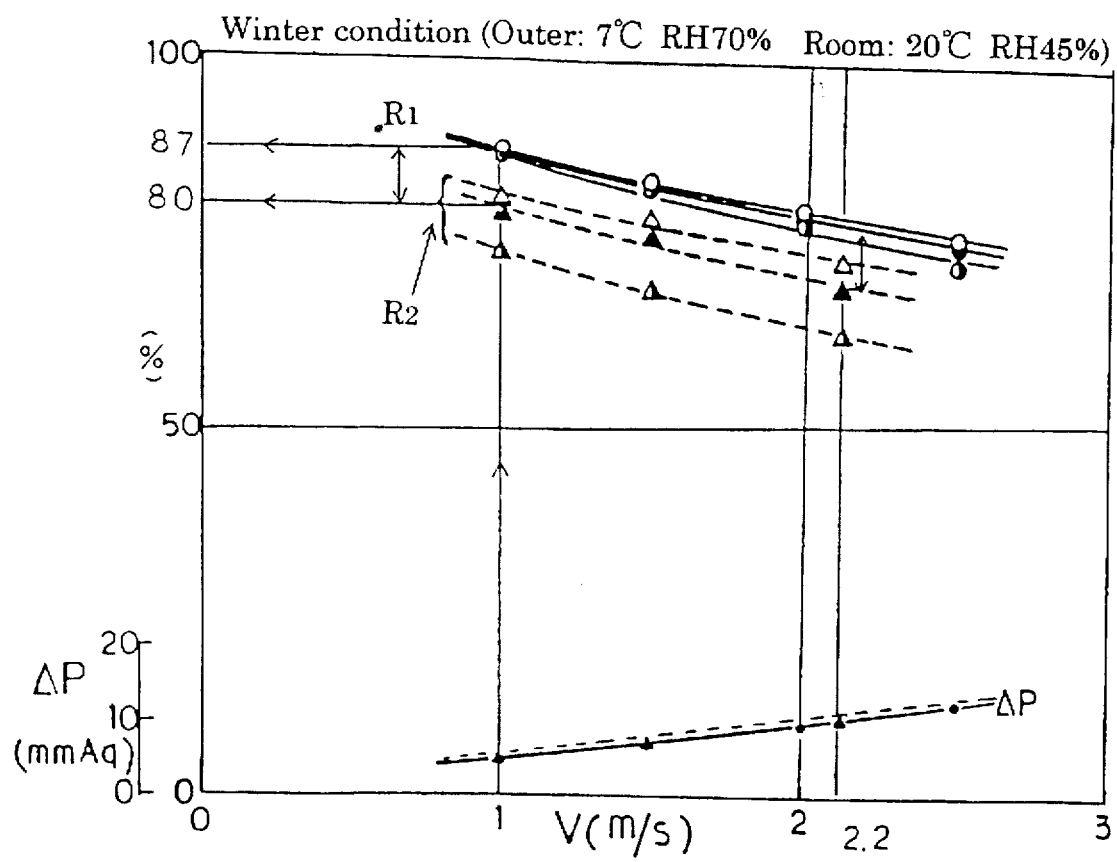
FIG. 9 is a graph showing total heat energy exchange efficiency of the total heat energy exchange rotor of the present invention and of the prior one in winter conditions.

FIG. 9 shows total heat energy exchange efficiency of the total heat energy exchange rotor $R_1$ mentioned above. FIG. 9 shows sensible heat, latent heat and total heat energy exchange efficiencies in winter conditions, i.e., outer air OA temperature is 7° C., its relative humidity is 70%, return air RA temperature is 20° C., its relative humidity is 45% and air velocities of the both air are 1–2.5 m/sec.

As seen in FIG. 9, the latent heat, sensible heat and total heat energy efficiencies of the total heat energy exchange rotor $R_1$ of the present invention mentioned above, which is prepared by impregnating No. 2 silica gel in glass fiber sheet paper, which is rigidly fixed, are better than these of the total heat energy exchange rotor $R_2$ which has been used and which is prepared by rigidly fixing approximately 20 g/m² of silica particles sold on the market of approximately 50–150 micron size on both sides of an aluminum sheet of approximately 30 micron thickness. That is, in the case of prior rotor $R_2$, values of sensible heat, latent heat and total heat energy exchange efficiencies are different at velocities of 1 m/sec. and 2.2 m/sec., respectively, and its total heat energy exchange efficiency is lower by approximately 10% than that of the rotor $R_1$ of the present invention. As seen in FIG. 9, in the case of the total heat energy exchange rotor $R_1$, values of sensible heat, latent heat and total heat energy exchange efficiencies show almost the same characteristic throughout region of air velocity of 1–2.5 m/sec. This is because the diameter of No. 2 silica gel particles is approximately 70 Å and that of prior silica gel particles rigidly adhered to an aluminum sheet is 50–150 microns. As No. 2 silica gel particles are much smaller than prior silica gel, which makes its surface area extremely large and its humidity adsorbing speed extremely fast, as shown in FIG. 2, the value of its latent heat exchange efficiency is high, almost corresponding to the value of its sensible heat exchange efficiency, and its total heat energy exchange efficiency shows the same characteristic.

EXAMPLE NO. 4

Figure 10:
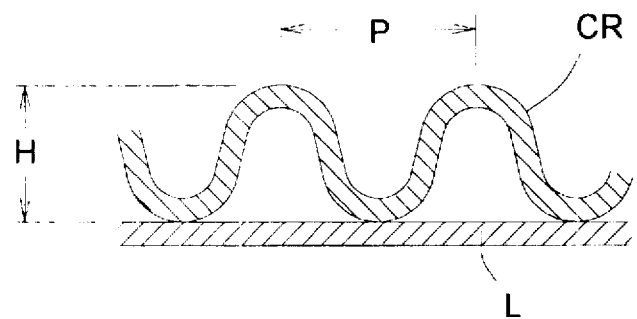
FIG. 10 is a sectional view of a single-faced corrugated sheet.
Figure 11:
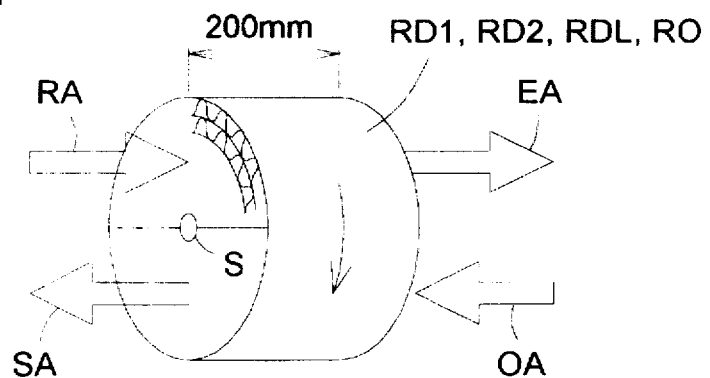
FIG. 11 is a perspective view of a honeycomb rotor for dehumidification.

A paper of 0.2 mm thick, consisting of ceramic fiber, glass fiber and a small amount of cellulose fiber, is formed into a single-faced corrugated sheet of 3.4 mm pitch P and 1.8 mm height H (FIG. 10). This is rolled and laminated around a core material S as shown in FIG. 11 to obtain a honeycomb formed body RD. This honeycomb formed body RD is impregnated with No. 2 silica sol (70 Å diameter of particles in sol) shown in Table 1 and is dried to obtain a dehumidifying honeycomb rotor $RD_1$. In this case the silica gel content is 60% of the weight of $RD_1$. In another method fine zeolite powder (particle diameter not larger than 7 microns) of 20% of the weight of No. 2 silica sol shown in Table 1 is dispersed in No. 2 silica sol. The honeycomb formed body RD mentioned above is impregnated with this dispersion and is dried to obtain a dehumidifying rotor $RD_2$. In this case, silica gel and zeolite contents are approximately 30% of the weight of $RD_2$, respectively. The rotor width of $R_1$ and $RD_2$ is 200 mm.

Tested were these four dehumidifying rotors $RD_1$, $RD_2$ and RO (Example 6) and a prior dehumidifying rotor RDL impregnated with 8 wt % of lithium chloride (200 mm width) (FIG. 11) using the same device and under the same conditions to compare their dehumidifying efficiencies. In the dehumidifier shown in FIG. 12, four rotors are installed respectively, area ratio of the dehumidifying zone 18 and the reactivating zone 19 is made 3:1, air velocity of the process air TA and the reactivation air HA are set at 2 m/sec., respectively, temperature of process inlet air TA is set at 25° C. and temperature of reactivation inlet air HA is set at 140° C. Dehumidifying performance of each dehumidifier using 4 kinds of rotors is shown in FIG. 13. In the drawing the abscissa shows absolute humidity (g/kg) of the process inlet air TA and the ordinate shows absolute humidity (g/kg) of the process outlet air that passed through rotors $RD_1$, $RD_2$, RO and RDL, respectively. As seen in FIG. 13, when absolute humidity of the process inlet air TA is 10 g/kg, dry air is read by the ordinate 3.2 g/kg for RDL, 2.2 g/kg for $RD_1$ and 1.0 g/kg for $RD_2$ as is read by point at 10 g/kg of the abscissa in FIG. 13. Therefore it can be seen that the dehumidifying performance of the $RD_1$ rotor of the present invention using minute No. 2 silica gel particles is higher than that of the prior RDL rotor which is impregnated with lithium chloride of 8% of the rotor weight by approximately (3.2−2.2)/3.2×100=31% and also that the dehumidifying performance of the $RD_2$ rotor, for which minute zeolite particles are mixed into No. 2 silica sol, than that of the $RD_1$ rotor by (2.2−1.0)/2.2×100=54%. The curve RA shows dried air DA temperature.

EXAMPLE NO. 5

Glass fiber paper of 0.2 mm thickness is prepared by adding organic binder, paper strength reinforcing agent and so on to glass fiber. In No. 2 silica sol mentioned above, minute particles of Diaion SK 1B Na type (called SK 1B hereinafter) sold by Mitsubishi Kasei Kabushiki Kaisha of 20% of the silica sol weight are dispersed as moisture adsorbing agent. The paper mentioned above is impregnated with this dispersion, and is dried to rigidly fix minute silica particles of approximately 20% of the weight of the paper and minute SK 1B particles of approximately 20% of the weight of the paper, thus obtaining a humidity and odorous gas exchange sheet. SK 1B mentioned above is, as shown in FIG. 20, strong acid cation exchange resin sodium type (neutral) having sodium sulfonate radical ($-SO_3Na$) as ionization radical chemically combined to benzene ring of synthetic resin which is formed by three-dimensional copolymerization of styrene and divinylbenzene.

Here minute silica particles act as moisture adsorbing agent and at the same time as a binder that combines minute particles of SK 1B, which is moisture adsorbing agent, to inside of and on the surface of the sheet. Thus obtained is a sheet with multiplied moisture adsorbing effect.

EXAMPLE NO. 6

A 0.2 mm thick paper made by mixing a small amount of pulp and glass fiber with ceramic fiber is formed into a single-faced corrugated sheet of 3.4 mm pitch and 1.8 mm height, which is rolled and laminated around a core material S as shown in FIG. 11 to obtain a honeycomb rotor. In No. 2 silica sol mentioned above, minute particles of SK 1B of Mitsubishi Kasei of 21% of the silica sol weight is dispersed. The honeycomb rotor mentioned above is impregnated with this dispersion and is dried to obtain a honeycomb dehumidifying rotor RO. The content of No. 2 silica gel and that of minute SK 1B particles are 20% of the weight of the dehumidifying rotor, respectively. The performance of this rotor RO is not so good as that of a rotor using silica sol and zeolite, but is better than that of a prior rotor using lithium chloride. Therefore it is good enough to be used as a honeycomb dehumidifier.

Figure 14:
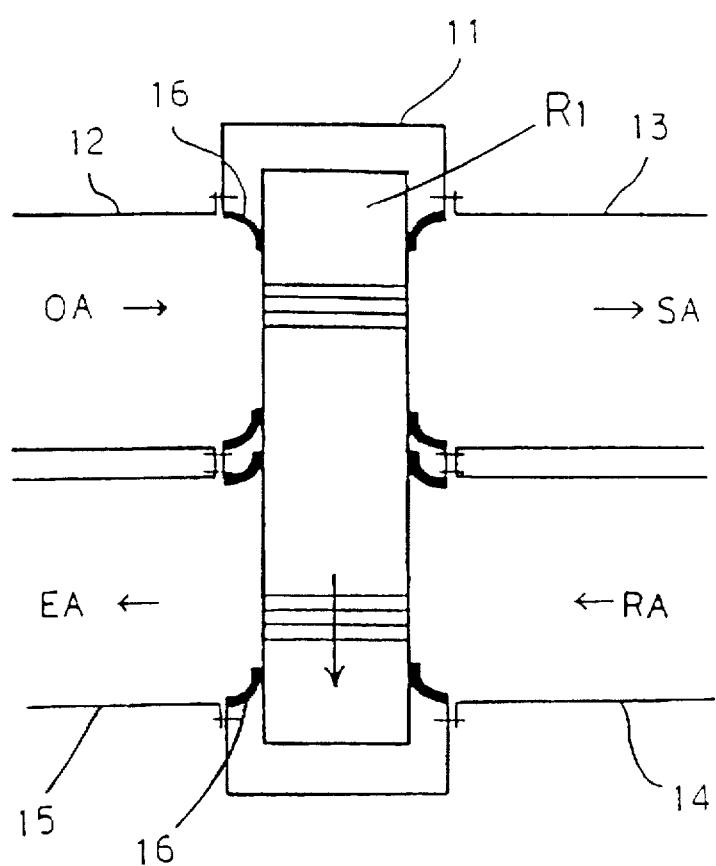
FIG. 14 is a central vertical sectional view of a rotary total heat energy exchanger.

As shown in FIG. 14, the total heat energy exchange rotor $R_1$ described in Example 3 (FIG. 8) is installed rotatably in a casing 11, to which equipped are an outer air OA duct 12, a supply air SA duct 13, a return air RA duct 14 and an exhaust air EA duct 15. And the rotor $R_1$ is rotated to perform total heat energy exchange between the outer air OA and the return air RA. For a rotor with a matrix of nonflammable paper (0.25 mm thick), its rotation speed is approximately 8-10 r.p.m. and for a rotor with a matrix of an aluminum sheet (0.1 mm thick), it is approximately 14-16 r.p.m. Air velocity is 1-2.7 m/sec. In the drawing, 16 is a seal.

Figure 12:
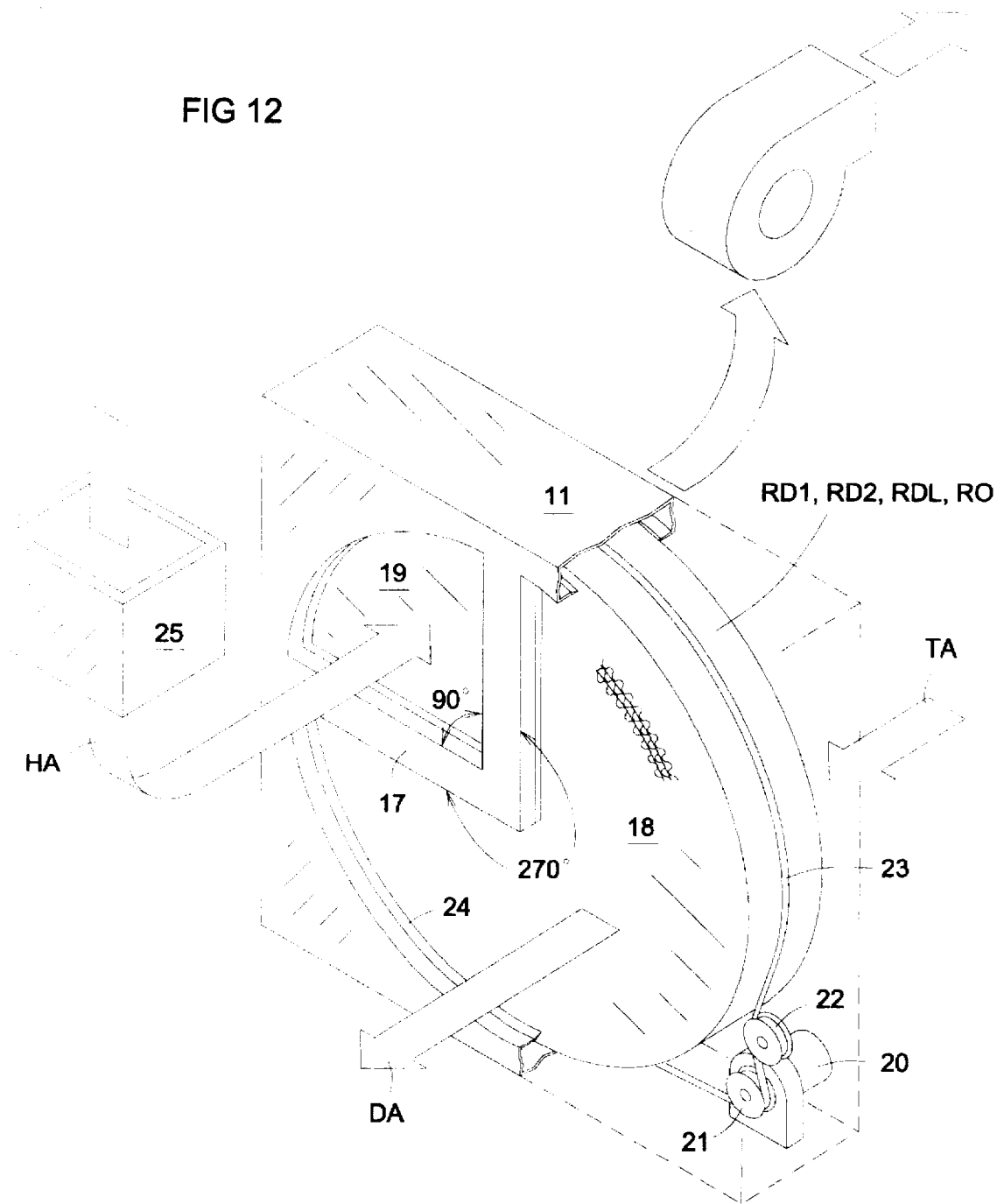
FIG. 12 is a partial cutaway perspective view of a dehumidifier.
Figure 13:
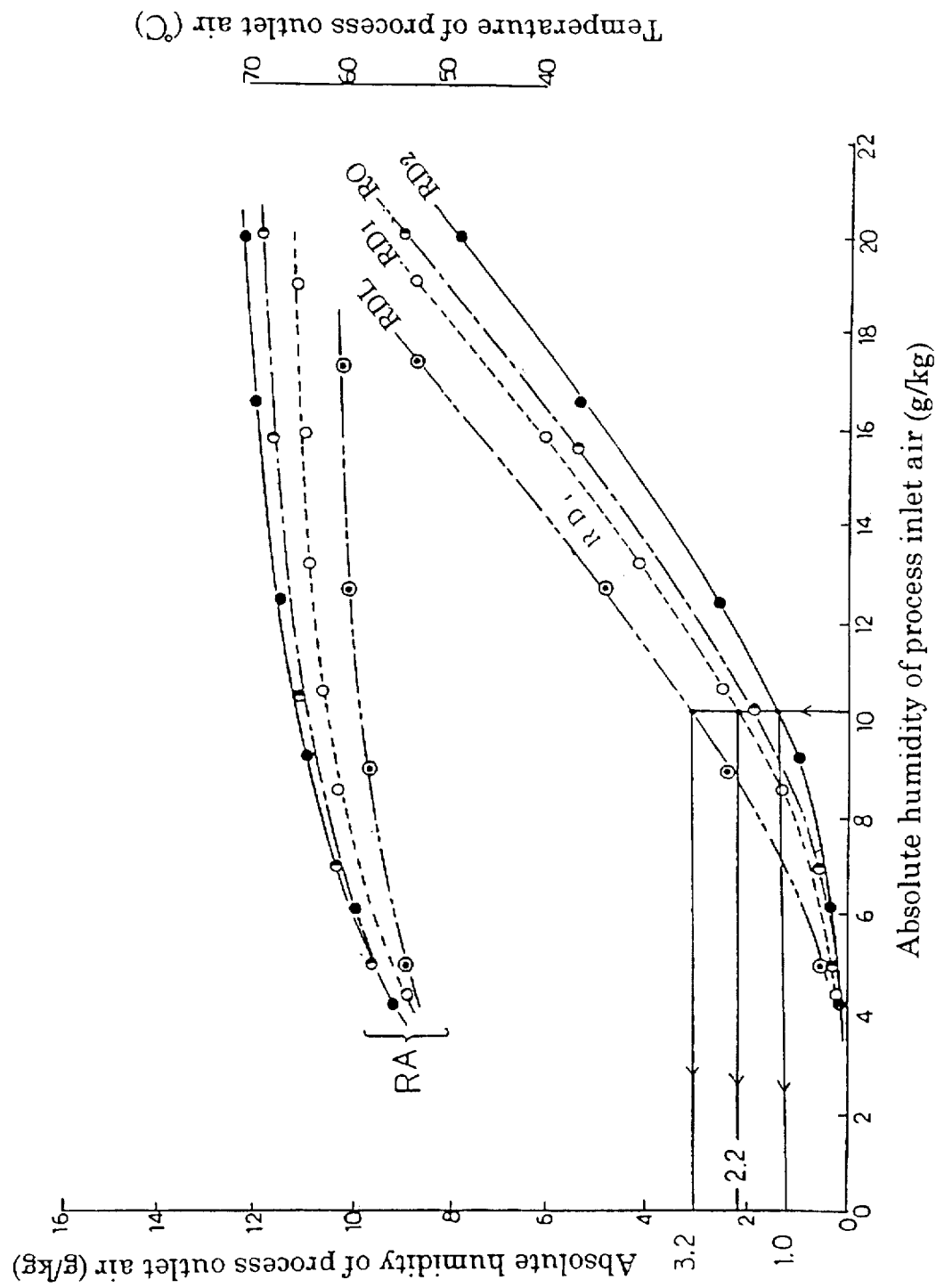
FIG. 13 is a graph showing dehumidifying efficiency of a honeycomb rotor for dehumidification.

When each of honeycomb dehumidifying rotors $RD_1$, $RD_2$, RDL and RO is used separately, each of rotors $RD_1$, $RD_2$, RDL and RO is installed rotatably in the casing 11 as shown in FIG. 12. A dehumidifying zone 18 and a reactivation zone 19 are separated by a separator 17, and the rotor is rotated by a geared motor 20, a pulley 21, a tension pulley 22 and a drive belt 23 at 10-25 r.p.h. to pass the process air TA to be dehumidified through the dehumidifying zone 18 at 1-3 m/sec. to obtain dehumidified air DA and the reactivation air HA through the reactivation zone 19 in the opposite direction at the same speed of 1-3 m/sec. to desorb/reactivate the reactivation part by hot air of 80°-150° C. In the drawing, 24 is a seal and 25 is a reactivation air heater.

In the present invention, a sheet or a honeycomb laminate is impregnated or coated with silica sol which contains minute silica particles with numerous stable silanol radicals on the surface and, having particle diameter not larger than 120 Å, with strong binding ability among themselves and with other materials. It is then dried to gelatinize and then rigidly fixed. Therefore each minute silica particle strongly binds to the honeycomb laminate and at the same time numerous minute silica particles bind with one another, thus forming numerous micropores of several Å - tens Å pore diameter and being fixed inside the sheet and on the surface of the sheet. In the present invention, a sheet or a honeycomb laminate is impregnated or coated with silica sol which contains minute silica particles of diameter smaller than 120 Å of the amount less than 30% of the weight of silica sol as solid content, and which also contains stable silanol radicals and a small amount of alkali metal $Na_2O$ of 0.1-1.0 wt % of silica sol. It is then dried to gelatinize in the honeycomb laminate which is then rigidly fixed. In the process of gelatinizing, numerous minute silica particles bind with one another to form numerous micropores of several Å - tens Å pore diameter, binding into the material of the honeycomb laminate.

In this process, silanol radicals are fixed on the surface of the micropores mentioned above and they, together with micropores, display strong adsorbing performance of water molecules. The existing of small amount of alkali metal ion also contributes to moisture adsorbing ability by their property as acceptor of $H_2O$ molecules. It has a characteristic that the smaller the diameter of silica particles, i.e., in silica sol is, the stronger the binding power among particles is, and when the amount of silica particles contained and dispersed in silica sol increases, sol is solidified in a shorter time. For example, if No. 2 silica particle in Table 1 is 70 Å in diameter, silica sol solidifies in a short time when the silica particle content in the silica sol is more than 30%. If No. 1 silica particle in Table 1 is 40 Å in diameter, the sol is unstable and solidifies when the content of silica particles is more than 15%. The silica sol cannot be used.

As is seen from curves No. 1 and No. 2 in FIG. 4, the smaller the diameter of silica particles in used silica sol is, the faster the humidity adsorbing speed of resulting silica gel tends to be. On the contrary, as is seen from curves No. 3, No. 4 and No. 5, the larger the diameter of silica particles is, the slower the humidity adsorbing speed tends to be. In the cross-flow type total heat energy exchange element (FIG. 1) shown in Example 2, humidity exchange between the outer air OA and the return air RA moves from the higher side of water vapor partial pressure between the outer air OA and the return air RA to the lower side. When the outer air (OA) has relative humidity of 70% and the temperature of 32° C., and the return air (RA) has relative humidity of 50% and the temperature of 25° C., the higher humidity in the air OA is first adsorbed on micropores, silanol radicals and sodium ion (called micropores etc. hereinafter) of the liner L and, gives adsorption heat to the adsorbing sheet L simaltanously, moves instantaneously to the air RA through channels of numerous micropores formed by minute silica particles in the adsorbing sheet L. The adsorbed water then evaporates, taking away evaporation heat and gives humidity to the low humidity air RA, thus performing latent heat exchange. In other words, it is considered that humidity in the air OA is adsorbed by the adsorbing sheet L with strong moisture adsorbing performance to generate heat and that the humidity and the adsorption heat simultaneously move to the air RA. That is, the larger the silica particle diameter in silica sol is, the larger the micropore diameter formed is, making adsorbing speed slower as mentioned above and therefore decreasing humidity transfer from the air OA to the air RA to result in the decrease of the so-called latent heat exchange efficiency.

When silica sol is dried, silica particles in the sol aggregate into chains and then becomes three-dimensional gel networks.

Therefore, an initial particle size in silica sol controls micropore size in gel networks. That is, the larger the silica particle diameter in silica sol is, the larger the micropore diameter formed in gels is.

Figure 15:
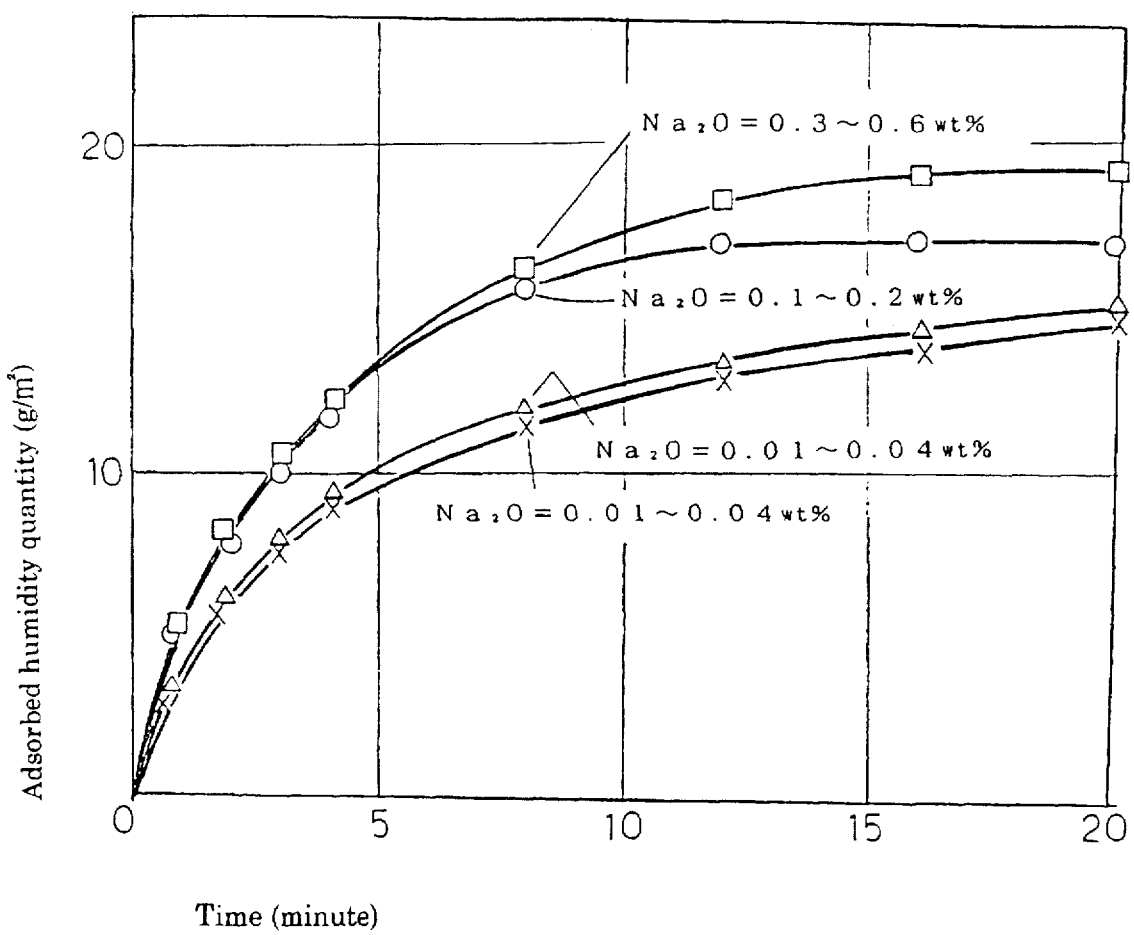
FIG. 15 is a graph showing relation between sodium ion content in silica sol and adsorption speed.
Figure 16:
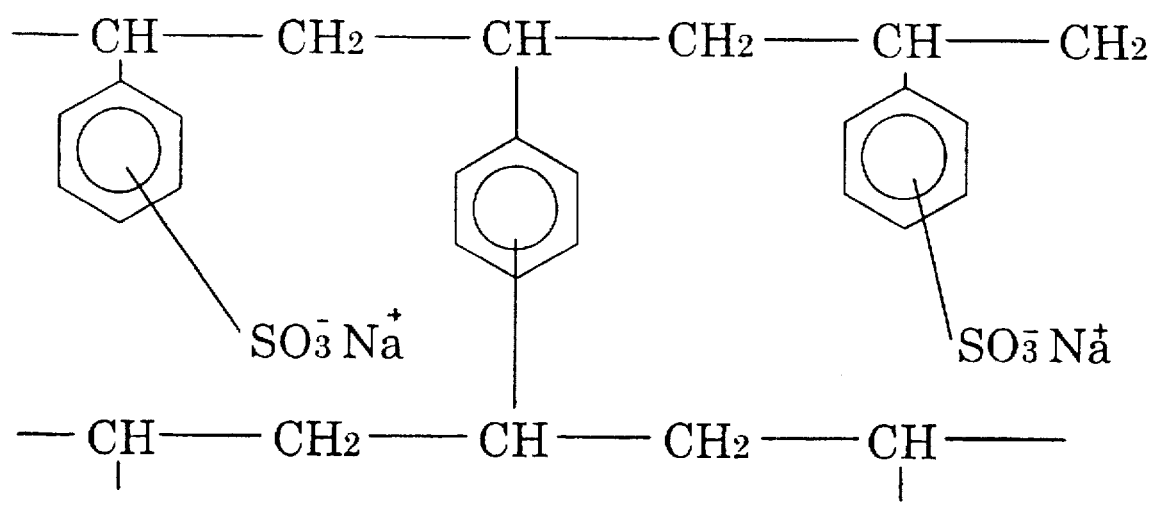
FIG. 16 is a constitutional formula of Diaion SK1B, a strong acid cation exchange resin sodium type (neutral).

FIG. 15 shows the influence of the quantity of sodium ions in silica sol to the adsorbing quantity. The diameter of silica particle in each silica sol is approximately 100 Å. It has been made clear by experiments that the more the quantity of $Na_2O$ in each silica sol is, the faster the adsorbing speed is and the more the adsorbing quantity per unit hour is. The range of the content of this $Na_2O$ is preferably 0.01–1.0%.

In the silica gel obtained from the silica sol used in the present invention, the smaller a minute silica particle in the silica sol is, the stronger its moisture adsorbing ability and binding ability of the silica gel are. When other adsorbents such as zeolite, minute silica gel particles, minute alumina gel particles, minute particles of organic high-polymer electrolyte, etc., are mixed into silica sol, which is impregnated in a sheet and which is rigidly fixed, the silica gel works as a strong binder, and the adsorbents mixed and silica gel itself work as adsorbents at the same time. Thus an effective adsorbing body can be obtained.

Hereinbefore, the adsorption of humidity has been explained, but the adsorber of the present invention can be also used for the adsorption of polar compounds and other odorous gases such as ammonia and ethers contained in low humidity air.

As mentioned above, the present invention is to obtain a humidity exchanging body by preparing silica sol which contains as solid content not more than 30% of silica particles of diameter not larger than 120 Å with many stable silanol radicals on the surface and also a little alkali metal ion such as 0.01–1.0% of $Na_2O$, by impregnating the silica sol or by coating it on a sheet or a laminate having numerous small channels, and by drying it to solid that is rigidly fixed. Therefore its manufacturing process is extremely simple and the humidity exchanging body can be manufactured inexpensively and, what is more, it remarkably improves a total heat energy exchange efficiency or a dehumidifying efficiency compared with prior ones.

What is claimed is:

1. An adsorbing body for humidity and odorous gas exchange which is made by preparing silica sol which contains as solid content not more than 30% of minute silica particles of diameter not larger than approximately 120 Å which have a plurality of stable silanol radicals on the surface and which have extremely strong binding ability with one another and strong bonding strength with other materials, by impregnating said silica sol in or by coating it on a sheet or a laminate having numerous small channels, and by drying them to gelatinize said sol that is then rigidly fixed on said sheet or laminate.

2. An adsorbing body for humidity and odorous gas exchange which is made by mixing/dispersing inorganic and/or organic humidity adsorbing or absorbing agent into the silica sol according to claim 1, by impregnating the dispersion or by coating it on a sheet or a laminate having numerous small channels, and by drying it to gelatinize said sol that is then rigidly fixed.

3. An adsorbing body for humidity and odorous gas exchange according to claim 2, in which the inorganic humidity adsorbing agent is zeolite.

4. An adsorbing body for humidity and odorous gas exchange according to claim 2, in which the organic humidity adsorbing agent is hydrophilic organic high-polymer electrolyte.

5. An adsorbing body for humidity and odorous gas exchange according to claim 2, in which the inorganic humidity absorbing agent is selected from the group consisting of lithium salts, magnesium salts and calcium salts.

6. An adsorbing body for humidity and odorous gas exchange which is made by impregnating a salt selected from the group consisting of lithium salts, magnesium salts and calcium salts in a sheet or a laminate which is then rigidly fixed, before or after the manufacture of the adsorbing body for humidity and odorous gas exchange according to claim 1.

7. A method for producing an adsorbing body for humidity and odorous gas exchange comprising steps of preparing silica sol which contains as solid content not more than 30% of minute silica particles of diameter not larger than approximately 120Å which have a plurality of stable silanol radicals on the surface and which have extremely strong binding ability with one another and strong bonding strength with other materials, impregnating said silica sol in or by coating it on a sheet or a laminate having numerous small channels, and drying them to gelatinize said sol that is then rigidly fixed on said sheet or laminate.

* * * * *